United States Patent [19]

Tamata et al.

[11] Patent Number: 4,622,175

[45] Date of Patent: Nov. 11, 1986

[54] PROCESS FOR SOLIDIFYING RADIOACTIVE WASTE

[75] Inventors: Shin Tamata; Susumu Horiuchi, both of Hitachi, Japan

[73] Assignee: Hitachi, Ltd., Tokyo, Japan

[21] Appl. No.: 478,994

[22] Filed: Mar. 25, 1983

[30] Foreign Application Priority Data

Mar. 25, 1982 [JP] Japan .................................. 57-48651
Mar. 25, 1982 [JP] Japan .................................. 57-48652

[51] Int. Cl.[4] ......................... G21F 9/16; C04B 12/04; C09D 1/02

[52] U.S. Cl. ...................................... 252/628; 106/74; 106/76; 106/85; 106/89; 252/633

[58] Field of Search ............... 252/628, 631, 633, 629, 252/626; 106/74, 76, 78, 84, 85, 89, 97, 98, 100; 423/20; 250/506.1, 507.1

[56] References Cited

U.S. PATENT DOCUMENTS

| | | | |
|---|---|---|---|
| 2,616,847 | 11/1952 | Ginell | 252/629 |
| 3,837,872 | 9/1974 | Conner | 106/74 |
| 3,959,172 | 5/1976 | Brownell et al. | 252/629 |
| 3,988,258 | 10/1976 | Curtiss et al. | 252/628 |
| 4,018,616 | 4/1977 | Sugahara et al. | 106/74 |
| 4,036,655 | 7/1977 | Yamada et al. | 106/74 |
| 4,056,937 | 11/1977 | Suzuki | 106/74 |
| 4,122,028 | 10/1978 | Iffland et al. | 252/631 |
| 4,173,546 | 11/1979 | Hayes | 252/628 |
| 4,226,556 | 10/1980 | Kayahara | 106/74 |
| 4,314,909 | 2/1982 | Beall et al. | 252/629 |
| 4,328,033 | 5/1982 | Boberski et al. | 106/74 |

*Primary Examiner*—Stephen J. Lechert, Jr.
*Assistant Examiner*—Howard J. Locker
*Attorney, Agent, or Firm*—Beall Law Offices

[57] ABSTRACT

A process for solidifying a radioactive waste by using an alkali silicate composition prepared by using as silicate source amorphous reactive silica obtained from acid earth by acid treatment as solidifying agent can give a solidified body excellent in weather resistance for a long period of time and excellent in resistance to leaching of radioactive materials with a low cost.

16 Claims, 10 Drawing Figures

PROCESS FOR SOLIDIFYING RADIOACTIVE WASTE

This invention relates to a process for solidifying a radioactive waste.

Radioactive waste solidified by using cement is good in stability due to the use of inorganic material. But in the case of using cement, since cement is porous, the leaching amount of radioactive material from the solidified body becomes large when a large amount of radioactive waste is solidified at one time. Therefore, it is necessary to use only a small amount of the waste at one time for solidification, which results in a marked undesirable increase in the amount of solidified waste. On the other hand, according to a process for solidifying radioactive wastes by using plastics disclosed in, e.g., Japanese Patent Appln Kokai (Laid-Open) No. 44700/73, the waste can be solidified in larger amount at one time than the case of using cement. But there are other problems in deterioration with the lapse of time, residual stress at the time of solidification, and the like due to the use of organic material. Further, plastics are expensive materials since they are produced from petroleum.

It is an object of this invention to provide a low cost process for solidifying a radioactive waste to give a solidified body having excellent resistance to weathering for a long period of time and resistance to leaching of radioactive material.

This invention provides a process for solidifying radioactive waste which comprises conducting solidification of radioactive waste using as solidifying agent an alkali silicate composition comprising an alkali silicate and a curing agent in a container, said alkali silicate being obtained by acid treating acid earth to remove basic components by dissolution to give activated clay, acid treating the activated clay to completely remove the basic components to give amorphous reactive silica and synthesizing the alkali silicate using said silica as silicate source.

Other features, objects and advantages of this invention will be made clear by the following explanations and the attached drawings.

The radioactive waste, can be solid waste obtained, for example, by drying and pulverizing radioactive waste (major component: $Na_2SO_4$) generated in an atomic power plant, etc. by a conventional method, or by drying and pulverizing a slurry of spent ion exchange resin in a dryer.

These solid radioactive wastes can be used in the form of powder obtained by using a conventional process, preferably in the form of pellets obtained by granulating a powdered waste and pelletizing the granulated waste by using a conventional process.

The silicate solidifying agent used in this invention will be explained in detail below.

Activated clay, which is obtained by removing basic components by dissolution from acid earth, a clay mineral, by acid treatment, is used as mineral adsorbent and decolorizing agent. By using a special silicate solidifying agent prepared from such an activated clay having ion adsorbing properties and solidifying radioactive waste, the resulting solidified product is surprisingly able to control the leaching of the radioactive material to a very low level and is excellent in resistance to weathering for a long period of time due to the use of inorganic material, and is low in production cost due to the use of inexpensive clay minerals.

Figure 1:
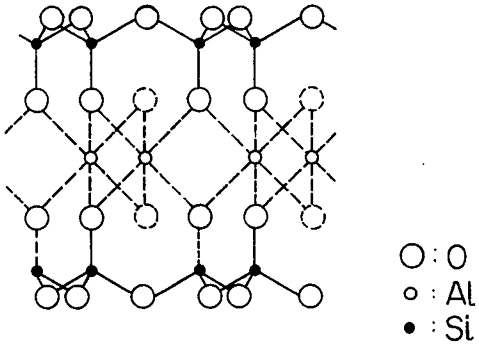
FIG. 1 is a sketch showing a fundamental structure of acid earth.

Acid earth belongs to the montmorillonite group, which is a smectite series clay mineral and has a fundamental structure as shown in FIG. 1, wherein a gibbsite layer of aluminum is sandwiched between two silica layers to form a silica-alumina-silica three-layer structure as a unit body. Layers of the unit body are bonded loosely along the c axis by water. Usually, some of aluminum atoms in the central gibbsite layer are replaced by magnesium and/or iron atoms and some of silicon atoms in the both silica layers are often replaced by aluminum atoms.

The basic components such as aluminum, iron, magnesium, etc. contained in acid earth are very easily released by an acid. This is quite different from the properties of other clays such as kaolin clays, etc.

Further, acid earth having the above-mentioned three-layer structure seems to be obtained by denaturing liparite and siliceous tuff by mainly alkaline hot spring, coordinating water to form clay, and subjecting to surface weathering. Thus, naturally occurring acid earth raw soil contains about 40 to 45% by weight of water, consists of very fine particles and has properties as colloid. Further, when such very fine particles are sufficiently swelled in water and suspended and dispersed, these particles show properties not precipitated nor separated easily.

When acid earth is acid treated by a conventional process to remove the basic components contained therein by dissolution, it becomes porous and active in electrochemical properties to give so-called "activated clay" having remarkably strengthened adsorption. Activated clay is usually used as a mineral adsorbing agent or decolorizing agent in decolorizing and purification of petroleum, fats and oils, etc.

When the resulting acid earth is further acid treated by a conventional process to remove the basic components completely, the alumina in the central gibbsite layer of three-layer structure of montmorillonite is removed to give amorphous reactive silica having a residual skelton based on the layer structure. The thus obtained silica has a gel structure, —OH groups and a specific surface area per unit weight of 50 to 500 $m^2/g$. Such a specific surface area of 50 to 500 $m^2/g$ is extremely large compared with that of silica obtained by pulverizing crystalline silica, i.e., 1 $m^2/g$ or less. Thus, such a silica consists of an aggregation of colloidal ultrafine particles having a very large specific surface area and has a hydration ability for retaining water, which properties are typical ones for general clays.

Figure 2:
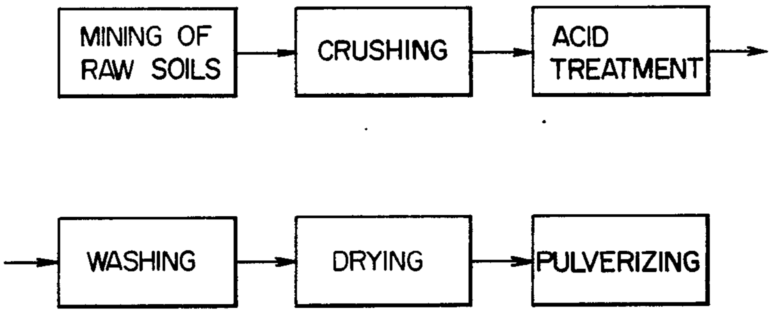
FIG. 2 is a flow diagram showing a process for producing acid earth by acid treatment, particularly from mining of raw soils to the production of acid earth by acid treatment.

The acid treatment of acid earth is illustrated in FIG. 2.

Using the thus obtained silica having a specific surface area of 50 to 500 $m^2/g$ in the gel form as silicate source, an alkali silicate is synthesized by reacting the silica with an alkali salt such as sodium hydroxide, potassium hydroxide, by a conventional process.

The silicate solidifying agent (or the alkali silicate composition) can be prepared by mixing such an alkali silicate with a curing agent such as silicon phosphate. The silicate solidifying agent may further contain a curing aid such as sodium silicofluoride, an improver for composition such as barium silicate, an aggregate such as cement, etc. A preferred silicate solidifying composition is 40–65 parts by weight of an alkali silicate, 25–35 parts by weight of a curing aid, 1–10 parts by weight of a curing agent, 10–20 parts by weight of improver and 5–15 parts by weight of aggregate, a total being 100 parts by weight. A more preferable composition comprises 44% of alikali silicate, 29% of sodium silicofluoride, 4% of silicon phosphate, 16% of barium silicate and 7% of cement, all percents being by weight.

Since the silicate solidifying agent is produced by using inexpensive clay as raw material, the production cost is low. Further the alkali silicate has ion adsorbing properties which are common to general clay minerals, so that when it is used as solidifying agent for radioactive wastes, it adsorbs radioactive ions and can control the leaching rate of radioactive materials from the solidified radioactive wastes at a very low level.

Figure 3:
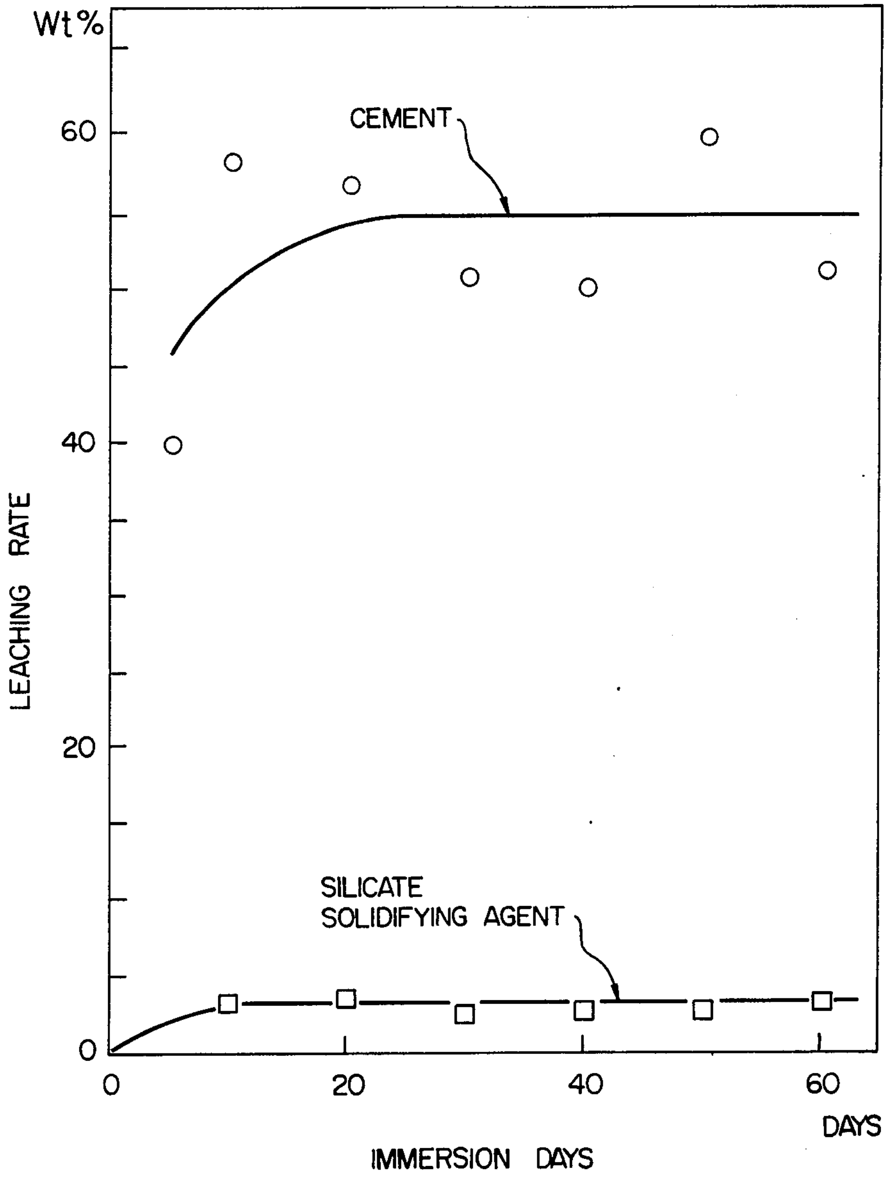
FIG. 3 is a graph showing a relationship between a leaching rate of Cs ions from cement or the silicate solidifying agent used in this invention and immersion days.

FIG. 3 shows the results of measurements of leaching rates by a cold test using Cs salt. Test pieces having a size of 35 mm in diameter and 36 mm long and containing about 0.14 g of a Cs salt are prepared by using portland cement or the silicate solidifying agent and the leaching rate of Cs ions is measured by immersing the test pieces in about 50 ml of distilled water for predetermined days. The concentration of Cs ions released into the water is measured by an atomic absorption method and the leaching rate is determined. As is clear from FIG. 3, the leaching rate in the case of using the silicate solidifying agent is about 1/17 time as small as that in the case of using portland cement, and thus the silicate solidifying agent is excellent in resistance to leaching.

As mentioned above, the silicate solidifying agent (or the alkali silicate composition) is a proper solidifying agent for radioactive wastes from the economical point of view and from the viewpoint of properties such as having ion adsorbing function inherently and excellent resistance to weathering for a long period of time because of inorganic material.

Figure 4:
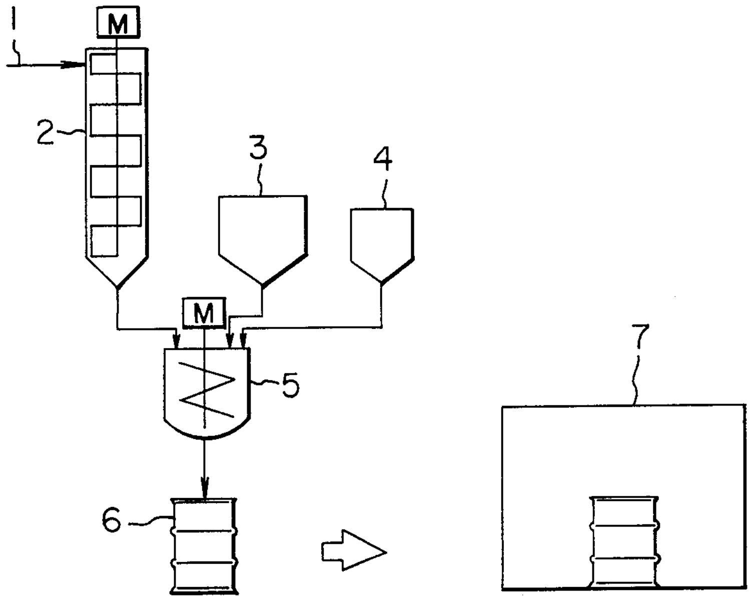
FIG. 4 is a drawing illustrating apparatus used in one embodiment in this invention wherein the silicate solidifying agent used in this invention is uniformly mixed with a powdered radioactive waste, followed by solidification.

One example of the process of this invention is explained referring to FIG. 4.

A radioactive waste supplied from a supplying line 1 is dried in a dryer 2. The resulting dried radioactive waste powder obtained from the dryer 2, a silicate solidifying agent from a solidifying tank 3 and water from an additional water tank 4 are mixed uniformly (water content 15–25% by weight) in a mixer 5. The resulting mixture is filled in a container 6 (a drum), and then transferred to a solidified body-curing chamber 7 and cured at room temperature (20° C.) for about 4 hours, followed by complete curing therein within 2 to 4 days. As the silicate solidifying agent, there is used an alkali silicate composition containing sodium silicate obtained from acid earth by acid treatment. As mentioned above, the curing time can be reduced to ¼–1/7 of the case using a conventional cement (portland cement).

Figure 5:
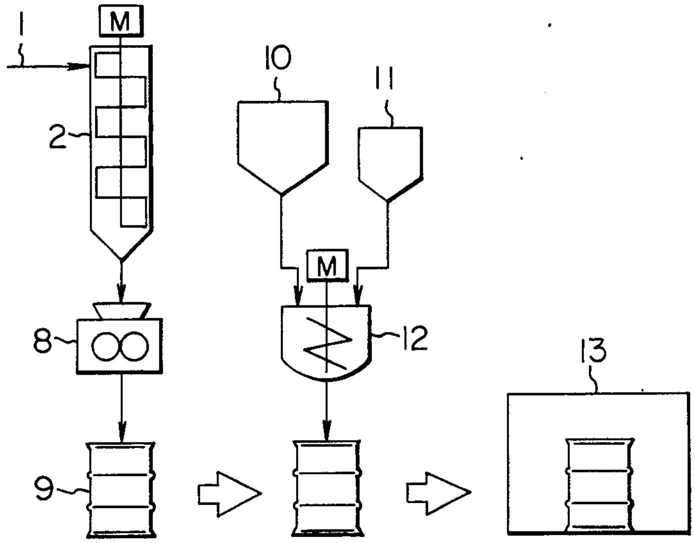
FIG. 5 is a drawing illustrating apparatus used in one embodiment in this invention wherein a radioactive waste is powdered, granulated and pelletized, followed by packing in a container, pouring of the silicate solidifying agent used in this invention and solidification.

FIG. 5 shows another example of the process of this invention wherein radioactive waste pellets obtained by granulating and pelletizing dried powdered radioactive waste are used. A radioactive waste taken out of a drier 2 is granulated by a granulator 8, followed by pelletization. The resulting waste pellets are packed in a container 9 in a predetermined amount. A silicate solidifying agent from a solidifying tank 10 and water from an additional water tank 11 are mixed in a mixer 12 to give a paste containing 15 to 25% by weight of water. The paste is then poured into the container 9 to fill spaces formed by the pellets, followed by complete curing in a solidified body-curing chamber 13 as mentioned as to FIG. 4. Other portions are the same as explained in FIG. 4.

According to the above-mentioned examples, the radioactive wastes are solidified by the alkali silicate composition (the silicate solidifying agent) prepared by using as silicate source the special silica obtained from acid earth which is clay minerals. The silicate solidifying agent has ion adsorbing properties which are common to general clay minerals and the ion adsorbing properties make it possible to control the leaching of radioactive materials from the solidified radioactive waste at a very low level (the leaching rate being about 1/17 compared with the case of using portland cement) showing high safety. Further, since inexpensive clay minerals are used as raw material, the silicate solidifying agent can be produced with a low cost, the production cost being about ⅓ or less compared with the case of using plastics now studied as solidifying agent. Further, since the major component of the silicate solidifying agent is made from inorganic materials and can give excellent weather resistance for a long period of time, the silicate solidifying agent is a very excellent material for solidifying radioactive wastes.

The above-mentioned examples show processes for solidifying radioactive wastes to give solidified bodies having excellent weather resistance for a long period of time and resistance to leaching, with a low cost by using the alkali silicate composition containing an alkali silicate prepared by using as silicate source the special silica obtained from clay minerals of acid earth. Such processes can be improved remarkably by the processes mentioned below giving solidified bodies having greater weather resistance and greater resistance to leaching at a lower cost than the above-mentioned case.

Containers made from inorganic materials are inexpensive and excellent in weather resistance. As the containers made from inorganic materials, there can be used PIC (polymer impregnated concrete) containers. The PIC container is a container made from a composite material obtained by forming a container by using cement, impregnating the cement-made container with a polymerizable monomer, and conducting the polymerization of the monomer. The PIC container has particularly excellent weather resistance and water resistance (resistance to leaching, resistance to swelling).

Examples using as container for radioactive waste PIC containers mentioned above and the silicate solidifying agent prepared by using as silicate source the special silica obtained from acid earth by acid treatment are explained referring to FIGS. 6 to 10.

Figure 6:
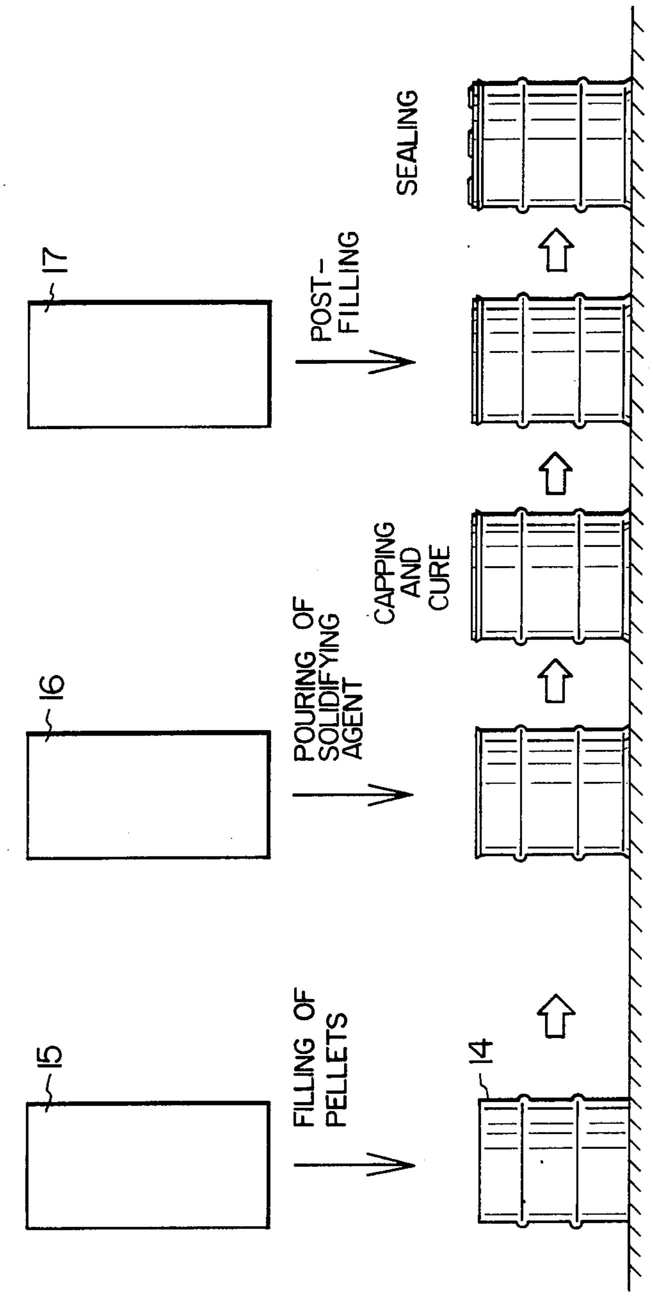
FIG. 6 is a flow diagram showing another embodiment of solidification according to this invention.

FIG. 6 is a flow diagram showing the whole process of one embodiment of such improved processes according to this invention. Numeral 14 is a drum having a thin PIC container therein tightly adhered to the inside walls of the drum. The inside of the thin PIC container is previously coated with the silicate solidifying agent. Radioactive waste pellets obtained by compression molding powdered radioactive waste are supplied from a pelletizing apparatus for waste 15 to the drum 14. Then the silicate solidifying agent containing an alkali silicate prepared by using as silicate source the special silica obtained from acid earth is poured from a solidifying agent pouring apparatus 16 into spaces among the pellets. Then the container is capped with a cap having two or more openings for post-filling and bonded by using an inorganic binder. Then the container is allowed to stand for cure under predetermined conditions. After cured for a predetermined time, the container is transported to a post-filling area, where the same solidifying agent as used previously is poured from a post-filling apparatus 17 through two or more openings in the cap into the vacant space formed in the upper portion of the container to post-fill and remove the vacant space. Finally, the openings are sealed by using stoppers and the like. In the case of disposal in the oceans, it is disadvantageous from the viewpoint of maintaining strength to retain vacant spaces in the container as well as in the solidified body. But in the case of disposal on land only piling one after another for storing and keeping, the post-filling is not always necessary and thus the post-filling step can be omitted.

The process as shown in FIG. 6 can also be applied to the case of solidifying uniformly a kneaded mixture of a radioactive waste powder and the silicate solidifying agent.

The shape and size of the inorganic material container can be determined optionally depending on the needs.

Further, since the strength of solidified body is insured by the whole of the solidified body (the container and the contents), the thickness of the PIC container can be reduced as small as possible. By this, the cost of PIC container and the filling effect of PIC container can be improved while retaining excellent properties such as weather resistance and water resistance of the PIC container as they are.

The post-filling of the silicate solidifying agent to the vacant space in the upper portion of the PIC container having solidified body therein can be conducted as follows. As the lid for the PIC container, there can be used one having 2 or more (usually up to 5) openings, one of which is used as a vent for removal of air and the rest of which are used for pouring the silicate solidifying agent. When the silicate solidifying agent reaches the under portion of the air vent, the pouring of the silicate solidifying agent is stopped and individual openings are sealed by stoppers using an inorganic binder.

Figure 7:
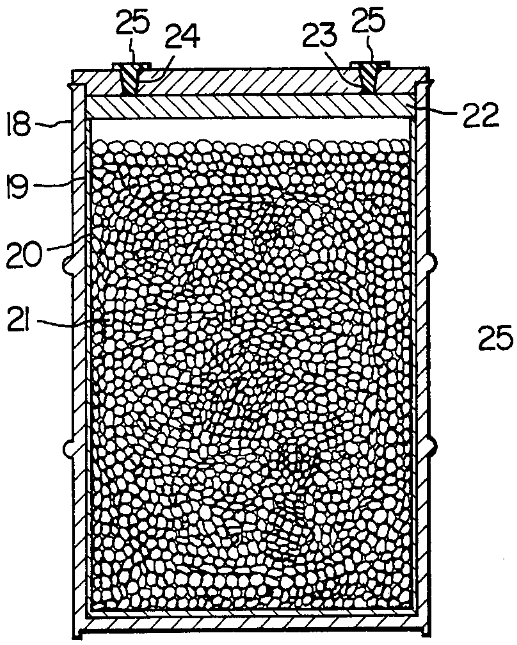
FIG. 7 is a cross-sectional view of solidified product by using pellets according to the process of this invention.

FIG. 7 is a cross-sectional view of a solidified body obtained according to this invention wherein a thin PIC container 19 is formed inside of a 200-liter drum 18 and the inside of the PIC container is covered by a silicate solidifying agent coating layer 20, and radioactive waste pellets 21 are solidified by using the silicate solidifying agent without voids. At the time of post-filling, the solidifying agent is poured from an inlet 23 and filled through a post-filling portion 22 in the vacant space of the upper portion of the container, while removing the air from a vent 24. When the silicate solidifying agent reaches the under portion of the vent 24, the pouring of the solidifying agent is stopped and the openings are sealed by stoppers 25.

Figure 8:
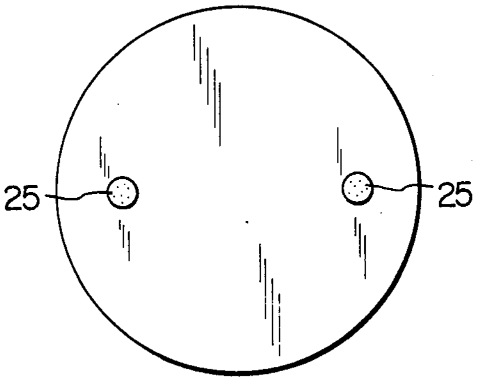
FIG. 8 is a plan view of the solidified product of FIG. 7 seen from the above.

FIG. 8 is a plan view of the solidified body of FIG. 7 seen from the above.

Figure 9:
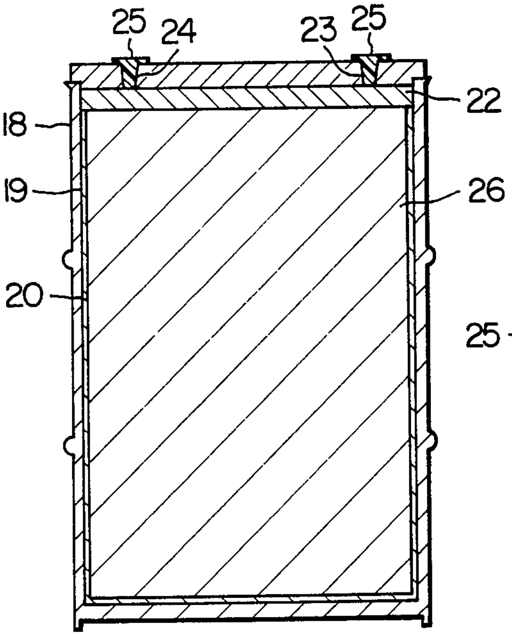
FIG. 9 is a cross-sectional view of a uniformly solidified product according to one embodiment of this invention.

FIG. 9 is a cross-sectional view of a uniformly solidified body obtained according to this invention, wherein a uniformly kneaded mixture 26 of a radioactive waste powder and the silicate solidifying agent is solidified, the rest of numerals being the same as in FIG. 7.

Figure 10:
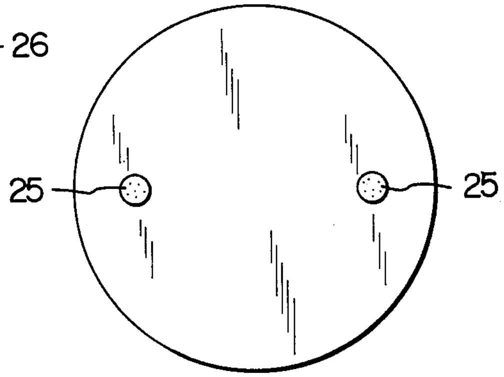
FIG. 10 is a plan view of the solidified product of FIG. 9 seen from the above.

FIG. 10 is a plan view of the solidified body of FIG. 9 seen from the above.

In the above-mentioned examples, a drum reinforced with a PIC container is used, but it is possible to use the PIC container alone. Further, it is also possible to use any inorganic material containers other than the PIC container alone or as reinforcing material for a drum or the like metal container.

According to the embodiments shown in FIGS. 6 to 10 of this invention, there can be obtained the following advantages in addition to the advantages obtained in the embodiments shown in FIGS. 4 and 5: since a thin inorganic material container such as a thin PIC container can be used for solidifying radioactive wastes and various strength required for finally obtained solidified bodies are satisfied by using such a thin inorganic material container, there can be obtained solidified bodies of radioactive waste with low cost and with high filling rate of the wastes compared with the case of using a thick PIC container; since the silicate solidifying agent does not shrink after curing and has good adhesion to an inorganic material (cement, brick, etc.), the strength of a container can be improved without producing vacant spaces due to shrinkage; since the inorganic material container is used, good weather resistance of the solidified bodies can be maintained for a long period of time sufficient for decaying the radioactivity of the wastes in the solidified bodies; since the coating layer of the silicate solidifying agent is formed inside of the inorganic material container, water resistance (resistance to swelling and resistance to leaching of radioactive materials) can also be improved.

What is claimed is:

1. A process for solidifying radioactive waste which comprises:

providing a container;

providing radioactive waste in said container;

adding an alkali silicate composition comprising amorphous reactive silica and a curing agent, wherein silica having a specific surface area of 50 to 500 $m^2/g$ is used to make the alkali silicate and is obtained by the acid treatment of acid earth;

mixing the radioactive waste and the alkali silicate composition in the container; and curing the resulting mixture; wherein the alkali silicate composition comprises 40 to 65 parts by weight of amorphous reactive silica, 25–35 parts by weight of sodium silicofluoride, 1–10 parts by weight of silicon phosphate, 10–20 parts by weight of barium silicate and 5-15 parts by weight of cement, the total being 100 parts by weight.

2. A process according to claim 1, wherein the radioactive waste is used in the form of pellets.

3. A process according to claim 1, wherein the radioactive waste is used in the form of powder and the solidification is conducted after kneading the radioactive waste powder with the alkali silicate composition.

4. A process according to claim 1, wherein the container is made from an inorganic material and the inside of said container has a coating layer of the alkali silicate composition.

5. A process according to claim 4, wherein the container made from an inorganic material is a thin polymer impregnated concrete (PIC) container.

6. A process according to claim 5, wherein the thin polymer impregnated concrete container is formed inside of a drum.

7. A process according to claim 1, wherein the solidification of radioactive waste is conducted in a container made from an inorganic material and the inside of said container is coated with the alkali silicate composition.

8. A process according to claim 7, wherein the container made from an inorganic material has a lid having two or more openings from which an additional amount of the alkali silicate composition is poured into a vacant space formed in the upper portion of the container to fill the vacant space and to improve the strength of solidified body as a whole.

9. A process according to claim 1, wherein the acid treatment comprises acid treating acid earth to dissolve and remove basic components and thus produce activated clay followed by acid treating the acid clay to further dissolve and completely remove additional basic components and thus produce amorphous reactive silica.

10. A process according to claim 9, wherein the alkali silicate is sodium silicate obtained by reacting the amorphous reactive silica with sodium hydroxide and the curing agent is silicon phosphate.

11. A process according to claim 9, wherein the acid earth is montmorillonite wherein a gibbsite layer of aluminum is sandwiched between two silica layers thus forming a silica-aluminum-silica three layer structure.

12. A process according to claim 1, wherein the alkali silicate composition comprises 44% alkali silicate, 29% sodium silicofluoride, 4% of silicon phosphate, 16% of barium silicate and 7% of cement, all percents being by weight.

13. A process according to claim 4, wherein, before kneading, water is added in an amount of 15-25% by weight of the mixture to be kneaded.

14. A process for solidifying radioactive waste according to claim 11, wherein the amorphous reactive silica has a gel structure and —OH groups.

15. A process for solidifying radioactive waste which comprises packing the radioactive waste and an alkali silicate composition, prepared by using as silicate source an amorphous reactive silica having a specific surface area of 50 to 500 $m^2/g$ and obtained from acid earth by acid treatment, into the inside of a container having an inner coating layer of the alkali silicate composition, and solidifying the contents of the container wherein the alkali silicate composition comprises 40 to 65 parts by weight of amorphous reactive silica, 25-35 parts by weight of sodium silicofluoride, 1-10 parts by weight of silicon phosphate, 10-20 parts by weight of barium silicate and 5-15 parts by weight of cement, the total being 100 parts by weight.

16. A process for solidifying radioactive waste which comprises:

providing a container;

providing radioactive waste in said container;

adding an alkali silicate composition comprising amorphous reactive silica and a curing agent, wherein silica having a specific surface area of 50 to 500 $m^2/g$ is used to make the alkali silicate and is obtained by the acid treatment of acid earth, and further wherein the acid earth is montmorillonite;

mixing the radioactive waste and the alkali silicate in the container;

curing the resulting mixture; wherein the alkali silicate composition comprises 40 to 65 parts by weight of amorphous reactive silica, 25-35 parts by weight of sodium silicofluoride, 1-10 parts by weight of silicon phosphate, 10-20 parts by weight of barium silicate and 5-15 parts by weight of cement, the total being 100 parts by weight.

* * * * *